(12) United States Patent
Choi

(10) Patent No.: US 7,847,851 B2
(45) Date of Patent: Dec. 7, 2010

(54) METHOD OF CONTROLLING DIGITAL PHOTOGRAPHING APPARATUS AND DIGITAL PHOTOGRAPHING APPARATUS USING THE METHOD

(75) Inventor: Jun-kwon Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 473 days.

(21) Appl. No.: 11/706,499

(22) Filed: Feb. 15, 2007

(65) Prior Publication Data

US 2008/0049111 A1 Feb. 28, 2008

(30) Foreign Application Priority Data

Aug. 24, 2006 (KR) ...................... 10-2006-0080631

(51) Int. Cl.
*H04N 5/222* (2006.01)
*G06F 3/048* (2006.01)

(52) U.S. Cl. ............................ 348/333.05; 348/333.11; 715/768

(58) Field of Classification Search ............ 348/333.05, 348/333.11, 333.12; 715/768
See application file for complete search history.

(56) References Cited

U.S. PATENT DOCUMENTS

| | | | | |
|---|---|---|---|---|
| 5,414,471 A * | 5/1995 | Saitoh et al. | ................... | 725/56 |
| 5,706,097 A * | 1/1998 | Schelling et al. | ............. | 358/296 |
| 5,903,309 A * | 5/1999 | Anderson | .............. | 348/333.02 |
| 6,147,703 A * | 11/2000 | Miller et al. | ............. | 348/220.1 |
| 6,700,612 B1 | 3/2004 | Anderson et al. | | |
| 7,064,780 B2 * | 6/2006 | Shimizu | ................... | 348/220.1 |
| 7,145,601 B2 * | 12/2006 | Misawa et al. | ......... | 348/333.05 |
| 7,187,412 B1 * | 3/2007 | Silverstein | ............. | 348/333.01 |
| 7,196,727 B2 * | 3/2007 | Sato | ...................... | 348/333.11 |
| 7,373,022 B2 * | 5/2008 | Matsumoto | ................. | 382/305 |
| 7,480,002 B2 * | 1/2009 | Goh et al. | .............. | 348/333.05 |
| 2003/0112357 A1 * | 6/2003 | Anderson | ............. | 348/333.05 |
| 2004/0100486 A1 * | 5/2004 | Flamini et al. | .............. | 345/723 |
| 2005/0251754 A1 * | 11/2005 | Padgett et al. | ................ | 715/779 |
| 2006/0031682 A1 * | 2/2006 | Sakai et al. | .................. | 713/182 |
| 2008/0012954 A1 * | 1/2008 | Sasaki et al. | ............. | 348/222.1 |

FOREIGN PATENT DOCUMENTS

| | | | |
|---|---|---|---|
| CN | 1652565 A | | 8/2005 |
| WO | WO 2006041171 A1 * | | 4/2006 |

OTHER PUBLICATIONS

Office Action established for CN200710087857.1.

* cited by examiner

*Primary Examiner*—Tuan Ho
*Assistant Examiner*—Daniel M Pasiewicz
(74) *Attorney, Agent, or Firm*—Drinker Biddle & Reath LLP

(57) ABSTRACT

Disclosed are a digital photographing apparatus and a method of controlling a digital photographing apparatus that allow a user to easily identify the current position of an image displayed on a display within a sequence of images and to easily identify a consecutive sequence of related images. The apparatus and method include displaying a lattice-shaped index on the display, which can be displayed at the same time as an image. At least one of the images represented as a region of the index relates to at least one other image represented as a region of the index. Regions of the index representing images that relate with one another have the same distinguishing characteristic, such as the same color, luminance, shading or shape to show that they are related.

16 Claims, 6 Drawing Sheets

METHOD OF CONTROLLING DIGITAL PHOTOGRAPHING APPARATUS AND DIGITAL PHOTOGRAPHING APPARATUS USING THE METHOD

BACKGROUND OF THE INVENTION

This application claims the priority of Korean Patent Application No. 10-2006-0080631, filed on Aug. 24, 2006, in the Korean Intellectual Property Office, the disclosure of which is incorporated herein in its entirety by reference.

1. Field of the Invention

The present invention relates generally to a method of controlling a digital photographing apparatus, and more particularly, to a method and apparatus allowing a user to easily identify the current position of an image displayed on a display within a consecutive sequence of images and to easily identify a consecutive sequence of related images.

2. Description of the Related Art

Generally, digital photographing apparatuses store image files obtained from a photographing operation in storage media when in a photographing mode and display the image files from the storage media when in a display mode.

FIGS. 1 and 2 are schematic views of images consecutively photographed and displayed on a display 3 of a conventional digital photographing apparatus. FIG. 3 is a schematic view of images consecutively photographed and displayed simultaneously on a display 3 of the conventional digital photographing apparatus.

When photographing a moving object such as a running person or a driving car, a user generally uses a consecutive photographing function of the conventional digital photographing apparatus. Then, the conventional digital photographing apparatus displays one of the images consecutively photographed on a display thereof as illustrated in FIGS. 1 and 2 or displays a plurality of reduced versions of the consecutively photographed images on the display as illustrated in FIG. 3. In FIG. 3, the first nine images Im1 through Im9 are images obtained by photographing a running person, and the remaining seven images Im10 through Im16 are images obtained by photographing a driving car.

In the case of the conventional digital photographing apparatus using the display method illustrated in FIGS. 1 and 2, when one of the consecutively photographed images Im1 through Im9 (see FIG. 3) of the running person is displayed on the display 3, if a user desires to skip several images and display the next sequence of consecutively photographed images Im10 through Im16 (see FIG. 3) of the driving car, the conventional digital photographing apparatus has to display each and every one of the images between the two images on the display 3. In addition, all other image files stored in the storage medium must be loaded and displayed on the display 3 until the desired image is displayed. Therefore, the time required for loading significantly increases, which, in turn, sharply increases the power consumption of the conventional digital photographing apparatus.

In the case of the conventional digital photographing apparatus using the display method illustrated in FIG. 3, there is a limit to the number of images that can be simultaneously displayed. In addition, since the conventional digital photographing apparatus has to load a plurality of image files stored in a storage, medium in order to simultaneously display them on the display 3, the loading time significantly increases, which, in turn, sharply increases the power consumption of the conventional digital photographing apparatus.

SUMMARY OF THE INVENTION

The present invention provides a method of controlling a digital photographing apparatus and a digital photographing apparatus, which enable a user to easily identify the current position of an image displayed on a display within a sequence of images and to easily identify a consecutive sequence of related images.

According to an aspect of the present invention, there is provided a method of controlling a digital photographing apparatus. The method includes displaying a lattice-shaped index portion in a region of a display when displaying any one of a plurality of images stored in a storage medium on the display of the digital photographing apparatus, wherein at least some of the images stored in the storage, medium sequentially and respectively correspond to a plurality of regions of the index portion in an order in which the images were photographed, and the regions of the index portion are displayed to have the same color, luminance design, shading, or shape if the images corresponding to the regions of the index portion are related with one another.

The index portion may be superimposed on the image which is displayed on the display.

The index portion may be displayed translucent.

The digital photographing apparatus may have a consecutive photographing function, and the images may be determined to be related to one another if the images were consecutively photographed using the consecutive photographing function of the digital photographing apparatus.

The images may be determined to be related to one another if the images were photographed on the same date.

The images may be determined to be related to one another if a time interval between a photographing time of an image corresponding to any one of the regions of the index portion and a photographing time of an image corresponding to a sequential nearest region is less than a predetermined time interval, which may be preset by a user.

The images may be determined to be related to one another if a time interval between a photographing time of an image corresponding to any one of the regions of the index portion and a photographing time of an image corresponding to a sequential nearest region is one second or less.

The digital photographing apparatus may have a consecutive photographing function and the time interval t between the photographing times of two images consecutively photographed using the digital photographing apparatus may be greater than one second, and images may be determined to be related to one another when the time interval between the photographing time of an image corresponding to any one of the regions of the index portion and the photographing time of an image corresponding to a sequential nearest region is less than an integer value obtained after the time interval t is rounded up to one decimal.

A region of the index portion corresponding to the image displayed on the display may be displayed with a particular border, outline, color, luminance, design, shading, shape, or other characteristic, such as flashing, which is different from that of adjacent regions.

The region of the index portion corresponding to the image displayed on the display may be changed to an adjacent region in response to a signal generated by, the user, and, accordingly, an image corresponding to the adjacent region may be displayed on the display.

According to another aspect of the present invention, there is provided a digital photographing apparatus using the method.

BRIEF DESCRIPTION OF THE DRAWINGS

The above and other features and advantages of the present invention will become more apparent from the following detailed description of exemplary embodiments and with reference to the attached drawings in which.

DETAILED DESCRIPTION OF THE INVENTION

The present-invention will now be described more fully with reference to the accompanying drawings, in which exemplary embodiments of the invention are shown. The invention may, however, be embodied in many different forms and should not be construed as being limited to the embodiments set forth therein.

Figure 4:
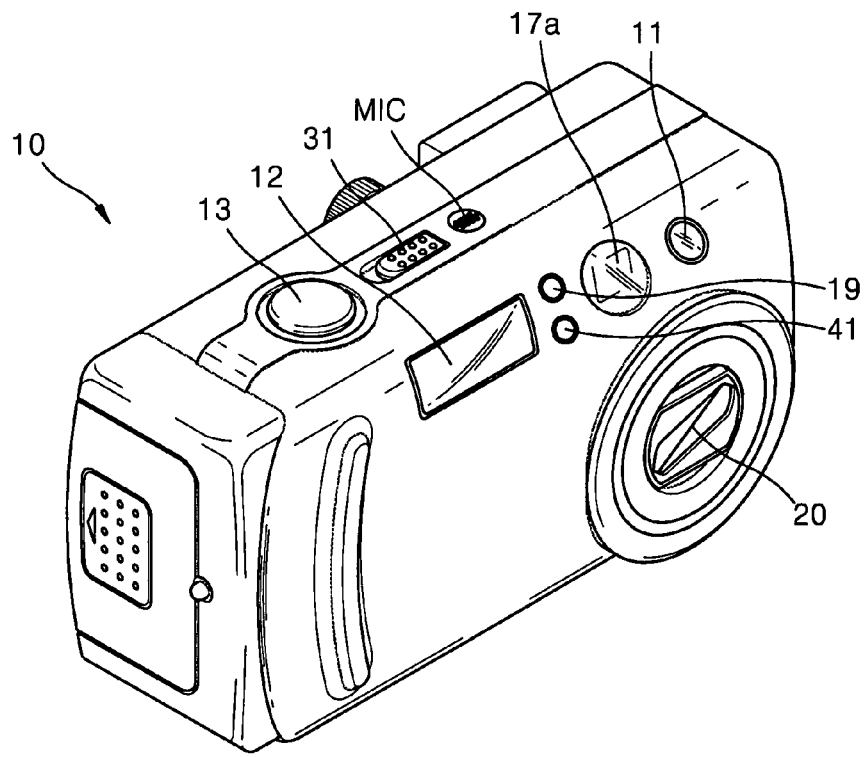
FIG. 4 is a schematic perspective view of a digital photographing apparatus according to an embodiment of the present invention.
Figure 5:
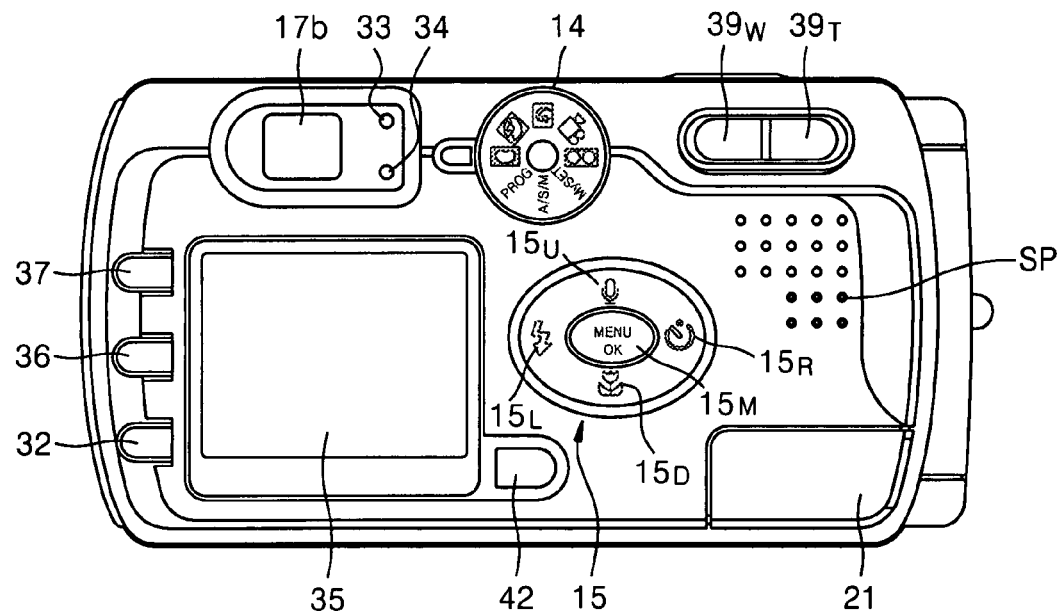
FIG. 5 is a back view of the digital photographing apparatus of FIG. 4.

FIG. 4 is a schematic perspective view of a digital photographing apparatus 10 according to an embodiment of the present invention. FIG. 5 is a back view of the digital photographing apparatus 10 of FIG. 4.

Referring to FIG. 4, the front part of the digital photographing apparatus 10 according to the present invention includes a microphone MIC, a self-timer lamp 11, a flash 12, a shutter release button 13, a viewfinder 17a, a flash light intensity sensor,19, a power switch 31, a lens unit 20, and a remote receiver 41.

In a self-timer mode, the self-timer lamp 11 operates at a set period of time from when the shutter release button 13 is pressed to when an image starts to be captured. When the flash 12 operates, the flash light intensity sensor 19 senses the intensity of light generated by the flash 12 and inputs the sensed intensity of the light to a digital camera processor (DCP) (not shown) via a micro controller (not shown). The remote receiver 41 receives a command signal, for example, a photographing command signal, and inputs the photographing command signal to the DCP via the micro controller.

Referring to FIG. 5, the back of the digital photographing apparatus 10 according to the present invention includes a mode dial 14, function buttons 15, a manual focus/delete button 36, a manual adjust/reproduce button 37, a display mode button 42, a speaker SP, a monitor button 32, an automatic focusing lamp 33, a viewfinder 17b, a flash standby lamp 34, a display 35, a wide-angle zoom button $39_W$, a telephoto zoom button $39_T$, and an external interface unit 21.

The mode dial 14 is used for selecting any one of several operating modes of the digital photographing apparatus 10, such as a simple photographing mode, a program photographing mode, a character photographing mode, a night view photographing mode, a manual photographing mode, a moving image photographing mode, a user setting mode, and a recording mode.

The function buttons 15 are used for operating specific functions of the digital photographing apparatus 10 and used to change images in order to display a desired image on the display 35. In addition, the function buttons 15 are used as control buttons to manage the movement of an active cursor on a menu screen of the display 35.

The manual adjust/display button 37 is used for manual adjustment of specified conditions. When any one of moving image files is selected, if a user presses the manual adjust/display button 37 in display mode,-the selected moving image file can be stopped or played.

The manual focus/delete button 36 is used for manually focusing or deleting in a photographing mode. The monitor button 32 is used for controlling the operation of the display 35. The display mode button 42 is used to switch between a display mode and a photographing mode.

The automatic focusing lamp 33 operates when focus is well adjusted. The flash standby lamp 34 operates when the flash 12 of FIG. 4 is in a standby mode. A mode indicating lamp $14_L$ indicates a selection mode of the mode dial 14.

The digital photographing apparatus 10 illustrated in FIGS. 4 and 5 may be a digital camera, a camcorder, or the camera portion of a camera phone, with a shape different from that in FIGS. 4 and 5. Also, the digital photographing apparatus 10 may be a lens replaceable camera such as a single lens reflex camera. In other words, various changes in the form of the digital photographing apparatus 10 can be made.

Figure 6:
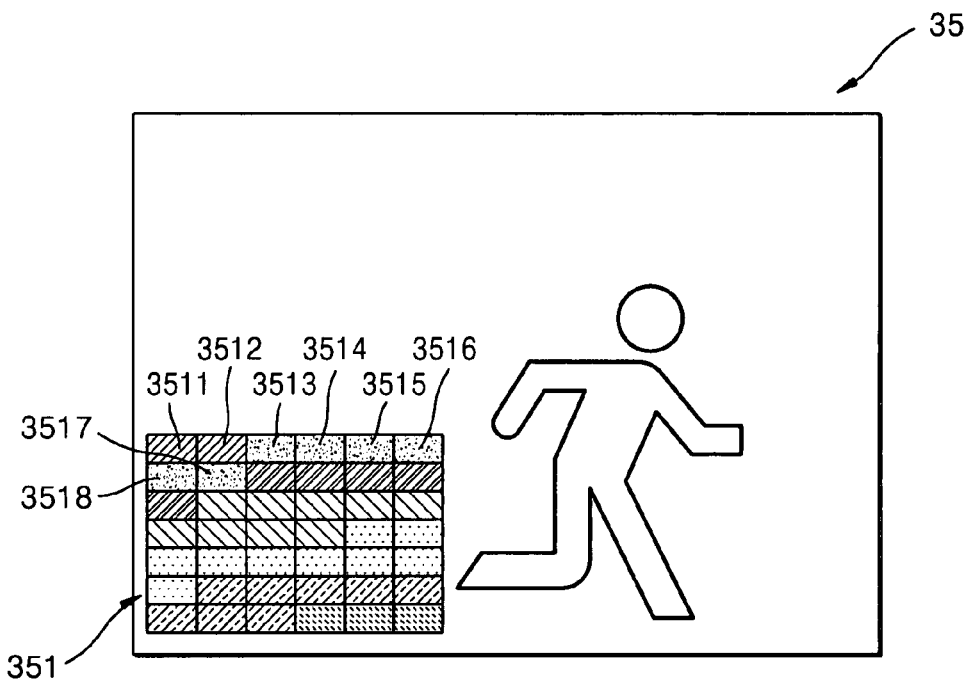
FIG. 6 is a schematic conceptual diagram illustrating a photographed image and an index portion displayed on a display according to an embodiment of the present invention.

FIG. 6 is a schematic conceptual diagram illustrating a photographed image and an index portion 351 displayed on a display 35 using a method of controlling a digital phpotographing apparatus according to an embodiment of the present invention.

Referring to FIG. 6, the digital photograph apparatus according to the present embodiment displays one of a plurality of images stored in a storage medium on the display 35 thereof. At this time, the digital photographing apparatus 10 also displays the lattice-shaped index portion 351 in a region of the display 35. Regions of the index portion 351 respectively correspond to at least some of a plurality of images stored in the storage medium. For example, the index portion 351 illustrated in FIG. 6 includes 42 regions. If the number of images stored in the storage medium is greater than 42, the 42 regions of the index portion 351 respectively correspond to 42 of the stored images. Conversely, if the number of images stored in the storage medium is less than, 42, some of the 42 regions of the index portion 351 respectively correspond to the stored images.

As described above, at least some of the images stored in the storage medium respectively correspond to the regions of the index portion 351. In this embodiment, the images sequentially correspond to the regions of the index portion 351 in an order in which the images were photographed. In other words, an image photographed after an image corresponding to a first region 3511 in a first row of the index portion 351 corresponds to a second region 3512 in the first row of the index portion 351. Accordingly, an image photographed after the image corresponding to the second region 3512 in the first row of the index portion 351 corresponds to a third region 3513 in the first row of the index portion 351.

In the method of controlling the digital photographing apparatus according to the present embodiment, when any one of the images stored in the storage medium is displayed on the display 35 of the digital photographing apparatus, the index portion 351 having the regions respectively corresponding to at least some of the stored images is also displayed. In addition, if the images respectively corresponding to the regions of the index portion 351 are related to one another, the regions of the index portion 351 are displayed to have the same color, luminance, or shape. In FIG. 6, the first two regions 3511 and 3512 of the index portion 351 are displayed to have the same color, luminance, or shape, and the, next six regions 3513 through 3518 are displayed to have the same color, luminance, or shape. In addition, the next five regions are displayed to have the same color, luminance, or shape. An embodiment where there is a relation between images will be described later.

Figure 7:
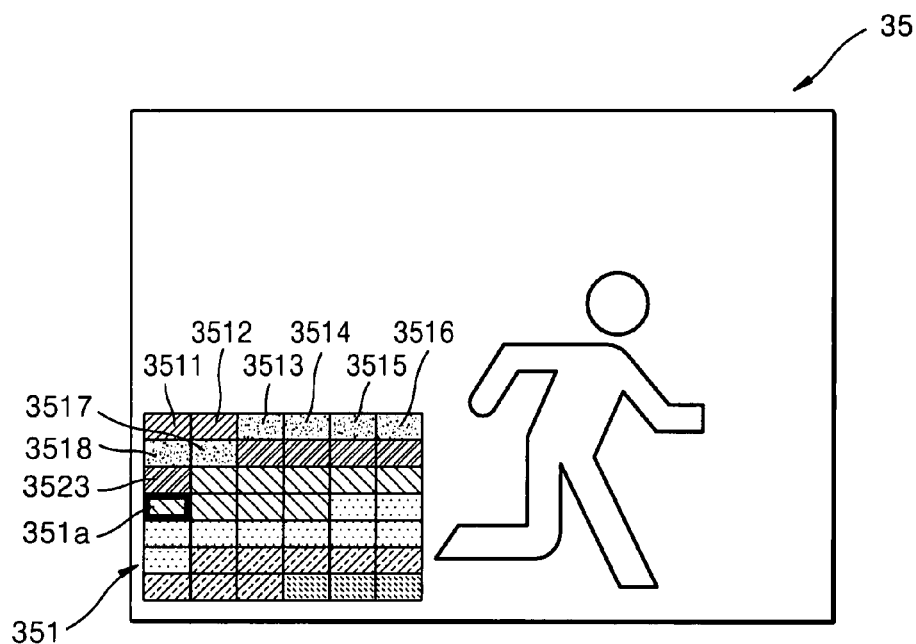
FIG. 7 is a schematic conceptual diagram illustrating a photographed image and an index portion displayed on a display according to another embodiment of the present invention.

The regions of the index portion 351 may also be displayed to have different colors, luminance, or shapes as illustrated in FIG. 7. FIG. 7 is a schematic conceptual diagram illustrating a photographed image and an index portion 351 displayed on a display 35 using a method of controlling a digital photographing apparatus according to another embodiment of the present invention. Referring to FIG. 7, one region 351a of the index portion 351 corresponding to an image displayed on the display 35 may have a different color, luminance, or shape from those of adjacent regions. This is to enable a user to easily identify a position or sequence in which the image currently displayed on the display 35 is stored in a storage medium, which will be described later.

As described above, the regions of the index portion 351 that correspond to related images may have the same distinguishing characteristic, such as the same color, luminance, design, shading or shape. Images may be determined to be related to one another in various cases. For example, images consecutively photographed using the consecutive photographing function of a digital photographing apparatus may be determined to be related images.

In the embodiment illustrated in FIG. 7, the first two regions 3511 and 3512 in a first row of the index portion 351, the next six regions 3513 through 3518, and the next five regions, respectively, correspond to related images and are displayed to have the same color, luminance, or shape. For example, images respectively corresponding to the first two regions 3511 and 3512 in the first row of the index portion 351 have been consecutively photographed using the consecutive photographing function of the camera. Also, images respectively corresponding to the next six regions 3513 through 3518 have been consecutively photographed using the consecutive photographing function of the camera. However, an image corresponding to the second region 3512 in the first row of the index portion 351 and an image corresponding to the third region 3513 have not been consecutively photographed. Therefore, the first two regions 3511 and 3512 in the first row of the index portion 351 are displayed to have the same color, luminance or shape, and the next six regions 3513 through 3518 are also displayed to have the same color, luminance or shape. However, the first two regions 3511 and 3512 are displayed to have different colors, luminance or shapes from those of the next six regions 3513 through 3518.

If each region of the index portion 351 is displayed in this way, a user can easily identify groups of images consecutively photographed using the consecutive photographing function of the digital photographing apparatus.

As illustrated in FIG. 7, if one 351a of the regions of the index portion 351 corresponding to the image displayed on the display 35 is displayed to have a different color, luminance or shape from those of adjacent regions so that the region 351a can be distinguished from the adjacent regions, the user can easily switch to an adjacent region using control buttons 15U, 15D, 15L and 15R of the function buttons 15 (see FIG. 5) of the digital photographing apparatus. Accordingly, an image corresponding to the adjacent region is displayed on the display 35.

As described above, according to a conventional method of controlling a digital photographing apparatus, when one of consecutively photographed images of a subject A is displayed on a display, if a user desires to skip several images and display one of consecutively photographed images of a subject B, the digital photographing apparatus has to display each and every one of images between the two images on the display. In addition, all other image files stored in a storage medium must be loaded and displayed on the display until a desired image is displayed. Therefore, the time required for loading significantly increases, which, in turn, sharply increases power consumption of the digital photographing apparatus.

However, in the method of controlling the digital photographing apparatus according to the present embodiment, one 351a of the regions of the index portion 351 corresponding to the image displayed on the display 35 is displayed to have a different color, luminance or shape from those of adjacent regions so that the region 351a can be distinguished from the adjacent regions. In addition, the user can easily switch to an adjacent region in any direction so that an image corresponding to the adjacent region can be displayed on the display 35. Therefore, in the case of the index portion 351 in FIG. 7, if the region 351a corresponding to the image displayed on the display 35 is changed to a region 3523 above the region 351a, an image corresponding to the region 3523 is displayed on the display 35. In other words, unlike in the conventional method of controlling the digital photographing apparatus, five images between the image corresponding to the region 351a and the image corresponding to the region 3523 are skipped and then the desired image corresponding to the region 3523 is displayed on the display 35 in the control method according to the present embodiment. Therefore, the time required until a desired image is displayed can be significantly reduced. Furthermore, since regions of the index portion 351 respectively corresponding to images consecutively photographed are displayed to have different colors, luminance or shapes, the user can easily search for a desired image that is to be displayed on the display 35 while viewing the index portion 351.

A variety of techniques may be used to distinguish the region 351a of the index portion 351 corresponding to the displayed image. As illustrated, the region 351a may have a dark outline. Alternatively, the region 351a may be flashing or have a different visual distinguishing characteristic.

According to the control method of the present embodiment, the index portion 351 does not represent reduced versions of specific images. Instead, different groups of regions of the index portion 351 are displayed to have different colors, luminance or shapes so that the different groups of related images can be distinguished from one another. Hence, unlike the conventional method of controlling the digital photographing apparatus illustrated in FIG. 3 in which a plurality of images are reduced and displayed accordingly on a display, in the control method according to the present embodiment, the time required for loading images can be significantly reduced, which, in turn, sharply reduces the power consumption of the digital photographing apparatus.

Figure 1:
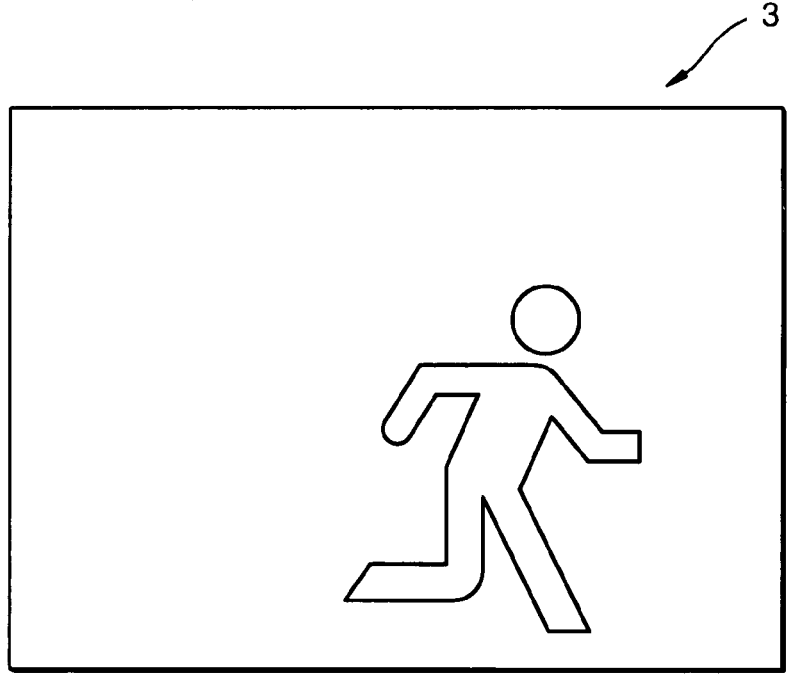
FIGS. 1 and 2 are schematic views of images consecutively photographed and displayed on a display of a conventional digital photographing apparatus.
Figure 2:
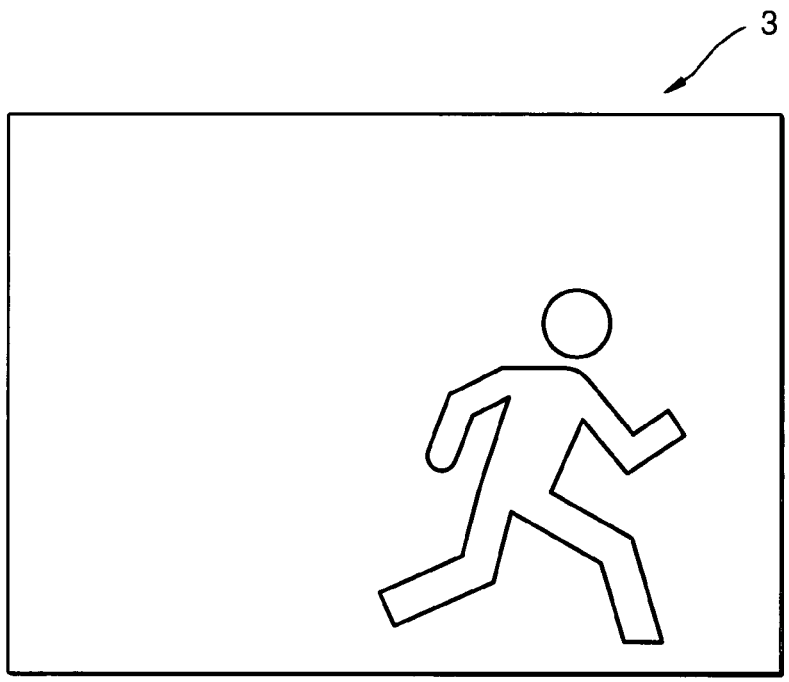
Figure 3:
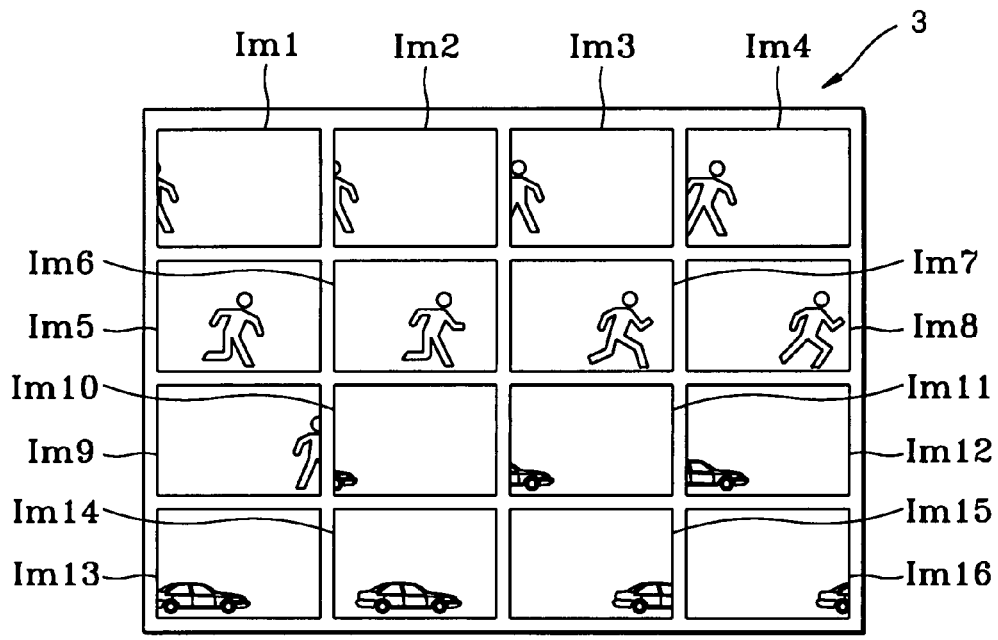
FIG. 3 is a schematic view of images consecutively photographed and displayed simultaneously on a display of the conventional digital photographing apparatus.

Moreover, in the case of the conventional control method illustrated in FIG. 3, there is a limit to reducing images since reduced versions of the images should be recognizable by a user. Hence, the number of images that can be simultaneously displayed on one screen is limited. However, according to the control method of the present embodiment, since the function of the index portion 351 is to represent each group of images distinguishable from other groups of images, each region of the index portion 351 does not need to be as large as an image corresponding to each region can be recognized as illustrated in FIG. 3. Consequently, the number of images that can be represented by the index portion 351 is far greater than the number of images that can be simultaneously displayed by the conventional digital photographing apparatus.

Images can be considered related to one another for numerous reasons. In one embodiment, images can be considered related if they were taken on the same date. In such an embodiment, if the images were photographed on the same date, regions of the index portion 351 corresponding to the images are displayed to have the same color, luminance, or shape.

In another embodiment, a user can preset a time interval so that images captured within that time interval are considered related. In this embodiment, if the interval between the time that an image corresponding to one of the regions of the index portion 351 is photographed and the time when an image corresponding to a sequential nearest region is photographed is less than the preset time interval, the images may be determined to be related images. Accordingly, the regions of the index portion 351 corresponding to the images may be displayed to have the same color, luminance, or shape. In this embodiment, photographed images are grouped according to the time interval preset by the user.

When a subject is photographed and an image of the subject is stored, the photographing time of the subject is generally stored in an image file. Therefore, in yet another embodiment, whether images consecutively photographed using the consecutive photographing function of the digital photographing apparatus are related may be determined based on the relative photographing times of the images stored in the corresponding image files. Similarly, other data describing an image, such as the image size, orientation, quality, and date is also stored in an image file. This data can also be used to determine if images are related to each other.

Figure 8:
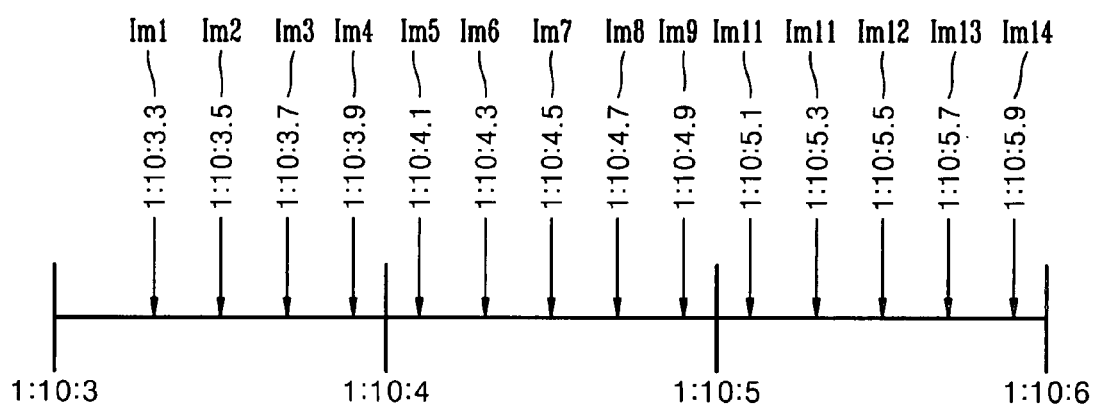
FIGS. 8 through 10 are schematic graphs illustrating time intervals between images consecutively photographed.

Some digital photographing apparatuses can perform a consecutive photographing operation at time intervals of 1 second or less. For example, if a digital photographing apparatus can consecutively take five pictures per second, the digital photographing apparatus can perform the consecutive photographing operation at time intervals of 0.2 seconds. FIG. 8 is a schematic graph illustrating a consecutive photographing operation performed from 1:10:3.3 to 1:10:5.9 using such a digital photographing apparatus.

In many digital photographing apparatuses, digits after the decimal point of a second in a photographing time are not stored in an image file. Instead, the second in the photographing time is stored as an integer. Therefore, if 14 images were photographed as illustrated in FIG. 8, the first four images Im1 through Im4 are all regarded as having been photographed at 1:10:3 and recorded in corresponding image files. The next five images Im5 through Im9 are all regarded as having been photographed at 1:10:4 and recorded in corresponding image files, and the next five images Im10 through Im14 are all regarded as having been photographed at 1:10:5 and recorded in corresponding image files. Thus, in many digital photographing apparatuses capable of performing a consecutive photographing operation at time intervals of 1 second or less, the maximum time interval between the photographing times of two images consecutively photographed, which are recorded in image files, is 1 second. Therefore, if such a digital photographing apparatus is used and if images consecutively photographed using the consecutive photographing function of the digital photographing apparatus are defined as related images, a relation between the images may exist when an interval between the photographing time of an image corresponding to a region of the index portion 351 and that of an image corresponding to a sequential nearest region is 1 second or less.

Figure 9:
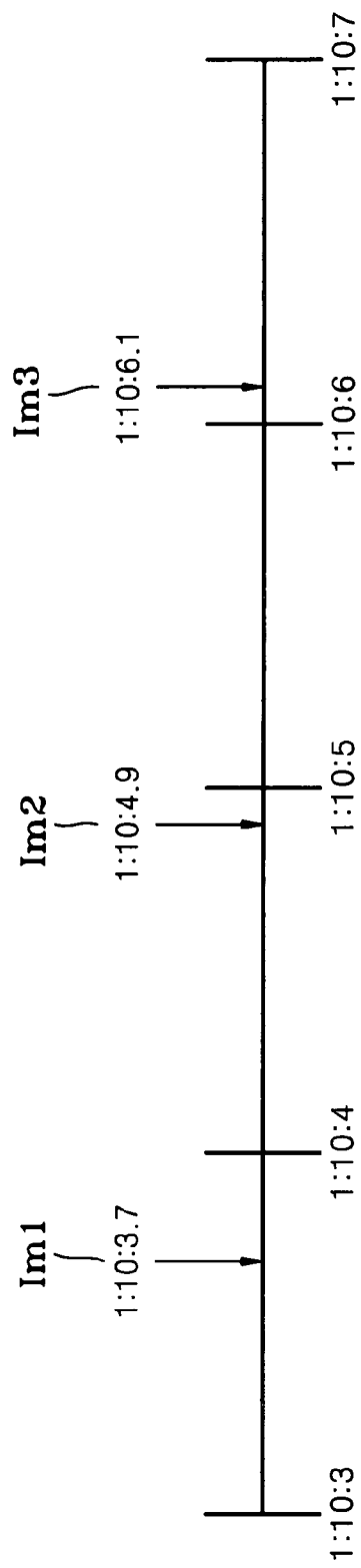

A digital photographing apparatus which can perform the consecutive photographing operation at time intervals of greater than 1 second may also be used. FIG. 9 is a schematic graph illustrating a consecutive photographing operation performed from 1:10:3.7 to 1:10:6.1 using a digital photographing apparatus which can perform the consecutive photographing operation at time intervals of 1.2 seconds.

Referring to the embodiment in FIG. 9, the first through third images, Im1 through Im3, are recorded in corresponding image files as having been photographed at 1:10:3, 1:10:4, and 1:10:6, respectively. If two images were consecutively photographed using the digital photographing apparatus which can perform the consecutive photographing operation at time intervals of 1.2 seconds, the maximum time interval between the photographing times recorded in the corresponding image files of the two images (that is, the time interval between the photographing time of the second image Im2 and that of the third image Im3) is 2 seconds.

Figure 10:
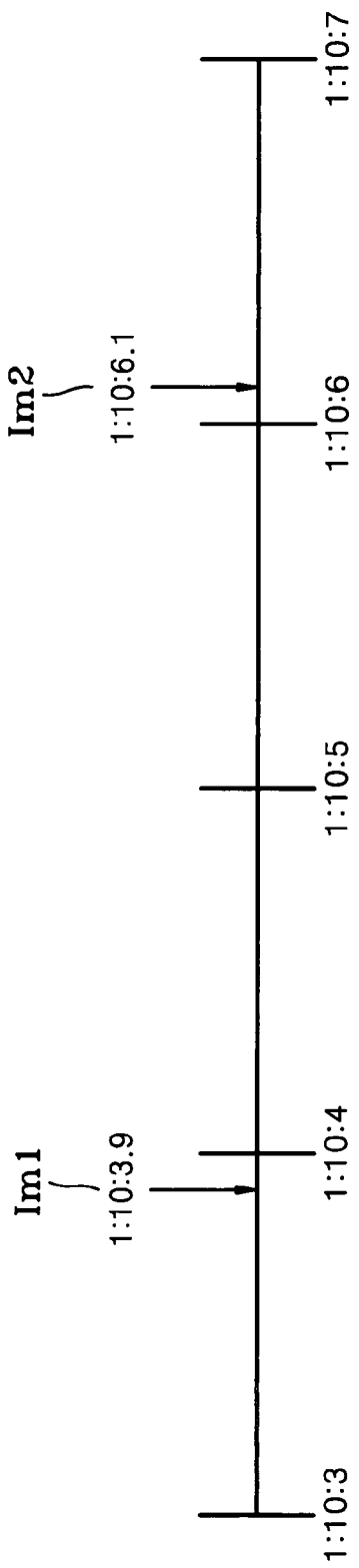

FIG. 10 is a schematic graph illustrating a consecutive photographing operation performed from 1:10:3.9 to 1:10:6.1 using a digital photographing apparatus which can perform the consecutive photographing operation at time intervals of 2.2 seconds.

Referring to the embodiment in FIG. 10, the first and second images, Im1 and Im2, are recorded in corresponding image files as having been photographed at 1:10:3 and 1:10:6, respectively. If the two images were consecutively photographed using a digital photographing apparatus that can perform the consecutive photographing operation at time intervals of 2.2 seconds, the maximum time interval between the photographing times recorded in the corresponding image files of the two images is 3 seconds.

Therefore, if a digital photographing apparatus has a consecutive photographing function and can perform a consecutive photographing operation according to a time interval t greater than 1 second, and if images consecutively photographed are defined as related images, a relation between the images may exist when an interval between the photographing time of an image corresponding to a region of the index portion 351 and that of an image corresponding to a sequential nearest region is less than an integer value obtained after the time interval t is rounded up to one decimal.

Figure 11:
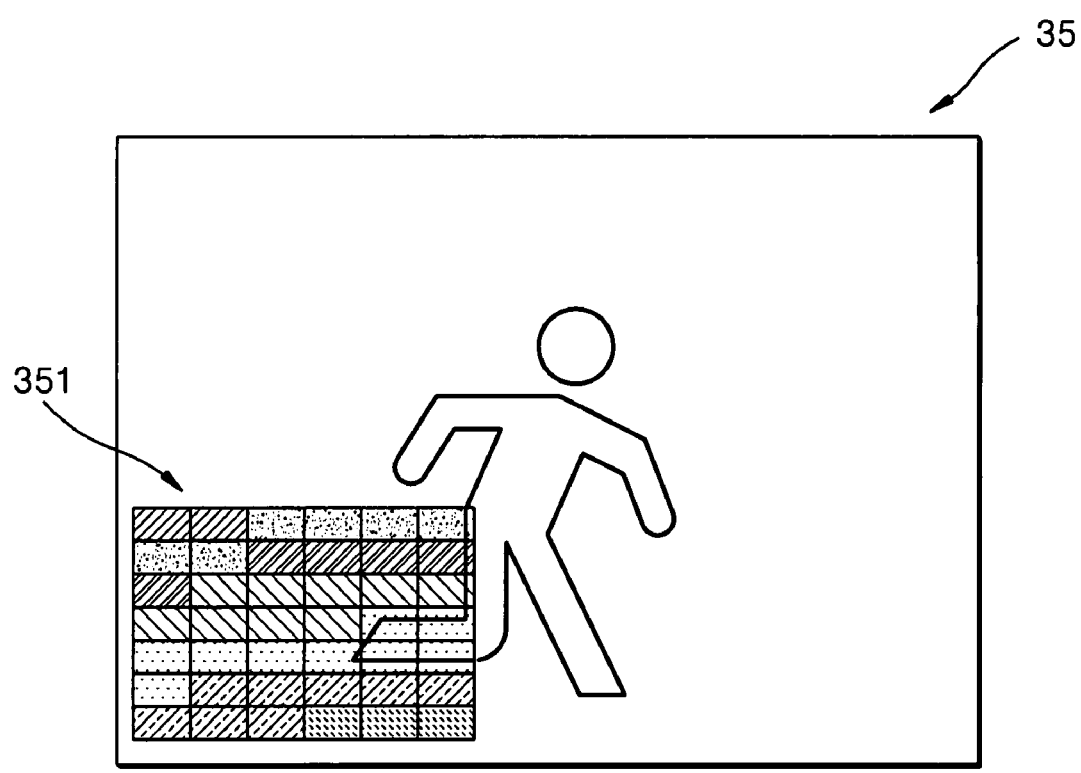
FIG. 11 is a schematic conceptual diagram illustrating a photographed image and an index portion displayed on a display according to another embodiment of the present invention.

FIG. 11 is a schematic conceptual diagram illustrating a photographed image and an index portion 351 displayed on a display 35 using a method of controlling a digital photographing apparatus according to another embodiment of the present invention. Referring to FIG. 11, the index portion 351 may be displayed superimposed on the image which is displayed on the display 35. Alternatively, the index portion 351 may not be superimposed on the image. However, considering the limited size of the display 35, it is desirable to superimpose the index portion 351 on the image. In this case, the index portion 351 may be translucent so that a user can easily recognize the image superimposed on the index portion 351.

As described above, when a method of controlling a digital photographing apparatus and a digital photographing apparatus using the method according to the present invention is used, a user can easily identify the current position of an image within a consecutive sequence of related images.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital photographing apparatus, the method comprising:
   displaying an image stored in a storage medium on a display of the digital photographing apparatus; and
   simultaneously displaying a lattice-shaped index on a portion of the display, the index having a plurality of regions, each region representing a captured image stored in the storage medium,
   wherein:
     some captured images consecutively photographed and stored in the storage medium are related to one another in a first group, the first group being related further based on at least one of file size, orientation, and quality of the image,
     some other captured images consecutively photographed and stored in the storage medium are related to one another in a second group, but are not related to the images in the first group, the second group being related further based on at least one of file size, orientation, and quality of the image,
     the regions representing related images in the first group have a first common distinguishing visual characteristic, and the regions representing related images in the second group have a second common distinguishing visual characteristic that differs from the first common distinguishing visual characteristic, and
     the index is superimposed in a transparent or semi-transparent manner on the currently displayed image so that the currently displayed image can be seen through the index.

2. The method of claim 1, wherein the common distinguishing visual characteristic of the regions representing related images is selected from the group consisting of color, luminance, design, shading, and shape.

3. The method of claim 1, wherein a region of the index represents the currently displayed image and has a unique distinguishing visual characteristic.

4. The method of claim 3, wherein the unique distinguishing visual characteristic of the region of the index representing the currently displayed image is selected from the group consisting of a border, outline, flashing, color, luminance, design, shading, and shape.

5. The method of claim 1, further comprising:
   setting a time interval, wherein images photographed within the time interval are related to each other in the first group.

6. The method of claim 1, wherein images are related to each other in the first group when a time interval between the photographing time of an image corresponding to any one of the regions of the index and the photographing time of an image corresponding to a sequential nearest region of the index is one second or less.

7. The method of claim 1, wherein
   the digital photographing apparatus has a consecutive photographing function and a time interval t between the photographing times of two images consecutively photographed using the digital photographing apparatus is greater than one second,
   and images are related to each other in the first group when the time interval between the photographing time of an image corresponding to any one of the regions of the index and the photographing time of an image corresponding to a sequential nearest region of the index is less than an integer value obtained after the time interval t is rounded up to one decimal place.

8. The method of claim 1, wherein two or more regions representing related images have a different distinguishing visual characteristic than adjacent regions of the index.

9. The method of claim 1, further comprising:
   selecting a region of the index, wherein the currently displayed image is replaced with an image corresponding to the selected region.

10. A digital photographing apparatus, comprising:
    an optical system for receiving light;
    a photoelectric conversion module in optical communication with the optical system for converting the light to captured image data;
    a recording medium for storing the captured image data in a captured image file;
    a display screen; and
    a controller connected with the photoelectric conversion module, the recording medium and the display screen, the controller processing and storing the captured image data in a photographing mode and, displaying an image relative to the captured image data in a stored-image display mode,
    wherein:
      the controller in the stored-image display mode displays an index superimposed on the image, the index having a plurality of regions, each region representing an image stored in the storage medium,
      some captured images consecutively photographed and stored in the storage medium are related to one another in a first group, the first group being related further based on at least one of file size, orientation, and quality of the image, and some captured images consecutively photographed and stored in the storage medium are related to one another in a second group, the second group being related further based on at least one of file size, orientation, and quality of the image, but are not related to the captured images in the first group,
      the regions representing related images in the first group have a first common distinguishing visual characteristic, and the regions representing related images in the second group have a second common distinguishing visual characteristic, and
      the index is superimposed in a transparent or semi-transparent manner on the currently displayed image so that the currently displayed image can be seen through the index.

11. The digital photographing apparatus of claim 10, wherein the digital photographing apparatus is a digital camera, a lens replaceable camera, or a camcorder.

12. The digital photographing apparatus of claim 10, wherein images are related to each other in the first group based on metadata stored in image files containing the images.

13. A method of controlling a camera, the method comprising:
    displaying an index with one or more regions on a display of the camera, the index having a plurality of regions, each region of the index representing a captured image stored in a storage medium of the camera, wherein:

some captured images consecutively photographed and stored in the storage medium are related to one another in a first group, the first group being related further based on at least one of file size, orientation, and quality of the image, some captured images consecutively photographed and stored in the storage medium are related to one another in a second group, but are not related to the images in the first group, the second group being related further based on at least one of file size, orientation, and quality of the image, and the regions representing related images in the first group have a first common distinguishing visual characteristic, and the regions representing related images in the second group have a second common distinguishing visual characteristic that differs from the first common distinguishing visual characteristic, and the index is superimposed in a transparent or semi-transparent manner on the currently displayed image so that the currently displayed image can be seen through the index.

14. The method of claim 13, further comprising:

displaying an image stored in the storage medium on the display of the camera, wherein the index is superimposed on the displayed image.

15. The method of claim 13, further comprising:

setting a time interval, wherein images photographed within the time interval are related to each other in the first group.

16. The method of claim 13, wherein:

the camera has a consecutive photographing function and a time interval t between the photographing times of two images consecutively photographed using the consecutive photographing function is equal to one second or less, and images are related to each other in the first group when the time interval between the photographing time of an image corresponding to any one of the regions of the index and the photographing time of an image corresponding to a sequential nearest region of the index is equal to one second or less.

\* \* \* \* \*